(12) United States Patent
Myers et al.

(10) Patent No.: US 12,443,606 B2
(45) Date of Patent: Oct. 14, 2025

(54) METHODS, SYSTEMS, AND APPARATUSES FOR IMPROVED DATA MANAGEMENT

(71) Applicant: COMCAST CABLE COMMUNICATIONS, LLC, Philadelphia, PA (US)

(72) Inventors: Nicholas S. Myers, Stephenson, VA (US); Raja Kumar Narasimhadevara, Chester Springs, PA (US); James A. Ficarra, Jr., Quakertown, PA (US); Amitkumar A. Patel, Katy, TX (US); Jayson Brooks Hurd, Highlands Ranch, CO (US); Pramod Dimri, Parker, CO (US); Anupam Mohanta, Chennai (IN); Chakrapani Velugubantla, Skillman, NJ (US); John Engler, Highlands Ranch, CO (US); Joseph K. Zia, Philadelphia, PA (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 0 days.

(21) Appl. No.: 16/885,065

(22) Filed: May 27, 2020

(65) Prior Publication Data
US 2021/0374145 A1    Dec. 2, 2021

(51) Int. Cl.
*G06F 16/2457* (2019.01)
*G06F 16/22* (2019.01)

(52) U.S. Cl.
CPC .... *G06F 16/24573* (2019.01); *G06F 16/2282* (2019.01)

(58) Field of Classification Search
CPC .......... G06F 16/24573; G06F 16/2282; G06F 21/6245; G06F 21/00
See application file for complete search history.

(56) References Cited

U.S. PATENT DOCUMENTS

| | | | |
|---|---|---|---|
| 2012/0130987 A1* | 5/2012 | Bose | G06F 16/24556 707/718 |
| 2017/0264619 A1* | 9/2017 | Narayanaswamy | H04L 63/105 |
| 2018/0232528 A1* | 8/2018 | Williamson | G06N 5/025 |
| 2019/0138625 A1* | 5/2019 | Umansky | G06F 16/245 |
| 2019/0179799 A1* | 6/2019 | Barday | G06F 16/907 |
| 2019/0266140 A1* | 8/2019 | Revach | G06F 16/221 |
| 2020/0050966 A1* | 2/2020 | Enuka | G06N 5/025 |
| 2020/0117824 A1* | 4/2020 | Upadhyay | G06F 16/221 |
| 2020/0125746 A1* | 4/2020 | Joshi | G06F 21/6245 |
| 2021/0084109 A1* | 3/2021 | Gimenez Palop | G06F 9/547 |
| 2021/0133557 A1* | 5/2021 | Lyoob | G06F 40/205 |
| 2021/0334407 A1 | 10/2021 | North et al. | |

* cited by examiner

*Primary Examiner* — William P Bartlett
(74) *Attorney, Agent, or Firm* — Ballard Spahr LLP

(57) ABSTRACT

Methods, systems, and apparatuses for improved data storage and data management are described herein. These methods, systems, and apparatuses may efficiently and accurately locate data associated with personal information (PI) within a single database as well as across a large data storage network consisting of numerous, disparate data stores. As an example, a computing device may use a database metadata table to determine a location(s) of PI-associated data across a plurality of databases.

26 Claims, 9 Drawing Sheets

METHODS, SYSTEMS, AND APPARATUSES FOR IMPROVED DATA MANAGEMENT

BACKGROUND

Many organizations store personal information (PI) (e.g., information that, when used alone or with other relevant data, can identify an individual) in numerous databases across the organization. The numerous databases may vary in size, type, location, structure, security, and the like. Locating and identifying the PI across such disparate databases is challenging. Existing data storage and data management solutions make it difficult to discover and classify PI-associated data efficiently and accurately. These and other considerations are addressed by the present description.

SUMMARY

It is to be understood that both the following general description and the following detailed description are exemplary and explanatory only and are not restrictive. Methods, systems, and apparatuses for improved data storage and data management are described herein. These methods, systems, and apparatuses may efficiently and accurately locate data associated with personal information (PI) within a single database as well as across a large data storage network consisting of numerous, disparate data stores. A computing device, such as a server, may be in communication with a plurality of databases. The computing device may include, or otherwise control, one or more collector modules. Each collector module may be configured to communicate with a particular type of database (e.g., Oracle™, MySQL™, MongoDB™, etc.). Each collector module may establish a communication session with at least one of the databases, retrieve database metadata from the at least one database, and send the database metadata to the computing device. During this process, it is not required to collect or sample data (e.g., raw data) that is stored in the at least one database.

The computing device may aggregate the database metadata received from each of the collector modules and convert, or otherwise standardize, the various database metadata into a common format. The computing device may generate a database metadata table that includes the aggregated database metadata. The database metadata table may include one or more rows of data indicative of the converted/standardized database metadata and may be further indicative of an identifier for the particular database associated with the database metadata stored in that row.

The computing device may apply one or more database metadata rules to the database metadata table in order to determine at least one portion of the database metadata table that may be associated with PI. The database metadata rules may be configured to locate certain character patterns that are likely to be indicative of PI-associated data. In this way, the computing device may use the database metadata table to determine a location(s) of PI-associated data across the plurality of databases.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein.

DETAILED DESCRIPTION

Figure 1:
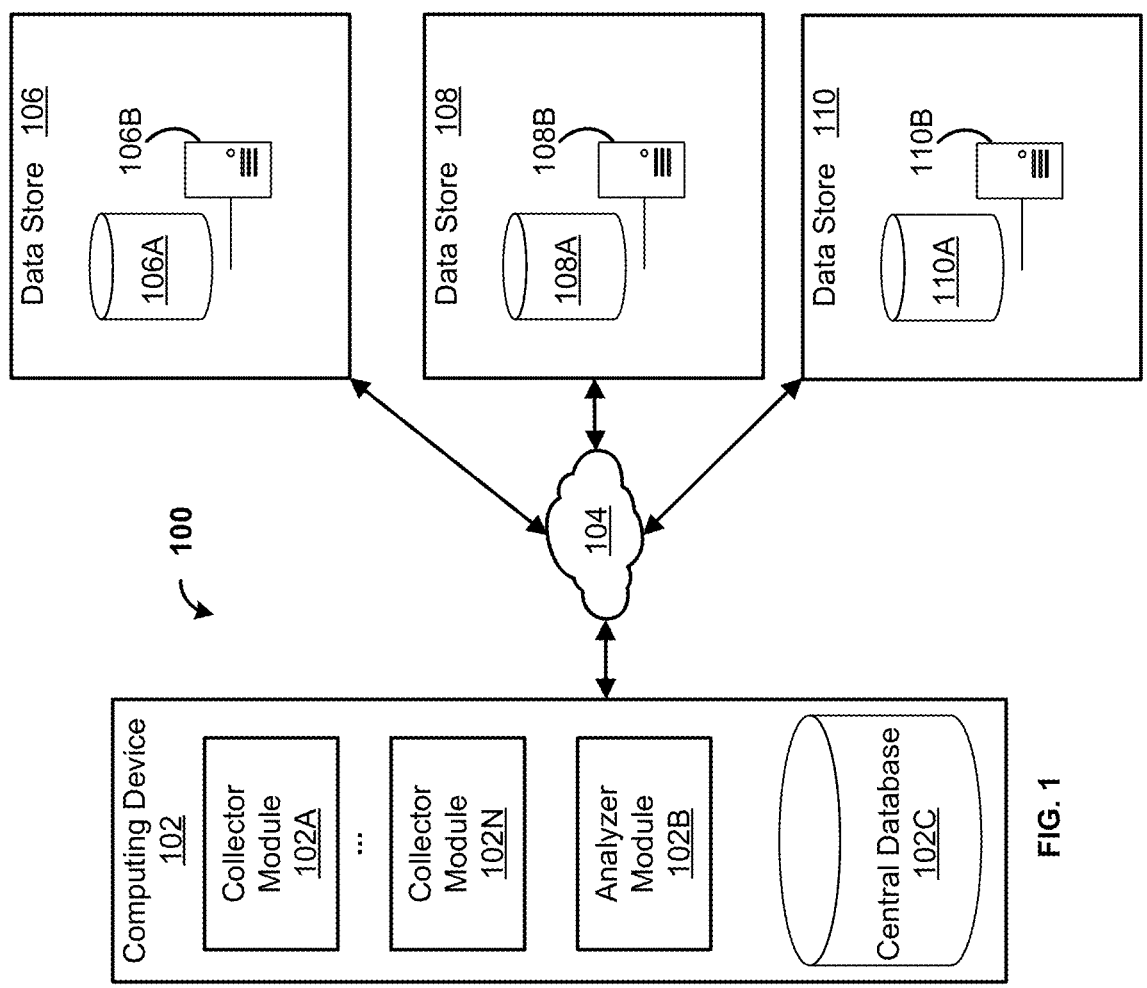
FIG. 1 shows a block diagram of an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for improved data storage and data management are described herein. Many database schemas in use today were designed prior to enactment of privacy legislation—resulting in engineers and application teams being unaware of what constitutes personal information (PI) associated data and where and how much PI-associated data is stored. It can be a time-consuming process for engineers and application teams to comb through the many databases, schemas, tables, and columns of data in order to identify where PI-associated data is being stored. In some newer data storage technologies, database documents do not have to follow stringent definitions, and each document may include differing attributes. As a result, countless documents need to be searched in order to identify the attribute(s) within the document that are associated with PI. Moreover, recently enacted privacy legislation requires a quick turn-around when a customer requests information related to their PI stored across the enterprise's databases.

The present methods, systems, and apparatuses may efficiently and accurately locate PI-associated data within a single database as well as across a large data storage network comprising numerous, disparate data stores (e.g., databases). A data store may comprise one or more data storage mechanisms, such as a relational database, an in-memory data store, a log, or any other data storage repository configured for a retrieval interface. For ease of explanation of the present methods, systems, and apparatuses, a data storage mechanism may be referred to herein as a "database." It is to be understood that any "database" referred to herein may comprise any type of suitable data storage mechanism as described herein.

PI may include information that, when used alone or with other relevant data, can describe aspects of an individual's identity, identify an individual, or identify an individual's digital footprint. A computing device, such as a server, may determine a plurality of databases that are to be searched to locate PI-associated data. PI-associated data may include one or more PI elements. A PI element may be, for example, a name; a date of birth; an age; a social security number; a gender; a height; a weight; a number of children; an address; an eye color; a language(s); a service address(es); an IP address(es); a MAC address(es); a serial number(s); a telephone number(s); a combination thereof, and/or the like. The PI element may comprise full or partial data. For example, a PI element may contain a birth year, rather than a full birthdate, a PI element may contain a last name, rather than a full name, a PI element may contain a partial social security number, rather than a full social security number, and the like.

The computing device may include, or otherwise control, one or more collector modules. Each collector module may retrieve connection credentials for one more of the databases and provide the connection credentials to the computing device. Each collector module may be configured to communicate with a particular type of database (e.g., Oracle™, MySQL™, MongoDB™ etc.). For example, each collector module may establish a communication session with at least one database of the plurality of databases and retrieve database metadata from the at least one database. During this process, no data (e.g., rows of data) that is stored in the at least one database that is associated with, or may be possibly associated with, PI may be collected or sampled by the collector module. For example, the collector module may only collect or sample column data (e.g., a data table's column names) while not collecting or sampling row data (e.g., a data table's record entries). The computing device may receive, via each of the collector modules, the database metadata for each of the plurality of databases.

The database metadata for a particular database may include a schema indicative of a relationship structure employed by the database. For example, the schema may indicate how one or more database tables are related by particular attribute(s). The schema may also indicate data table names, column names, column attribute datatypes, column descriptions, a combination thereof, and/or the like. The computing device may aggregate the database metadata received from each of the collector modules. For example, the computing device may convert, or otherwise standardize, the database metadata received from each of the collector modules into a common format. The computing device may generate a database metadata table that includes the aggregated database metadata. The database metadata table may include one or more rows of data indicative of the converted/standardized database metadata received from each of the collector modules. For example, the one or more rows of the database metadata table may include one or more of the following: a data table name, a column name, a column attribute datatype, or a column description. Each row of the database metadata table may be further indicative of an identifier for the particular database associated with the database metadata stored in that row.

The computing device may apply one or more database metadata rules to the database metadata table in order to determine at least one portion of the database metadata table that may be associated with PI. The database metadata rules may be configured to locate certain character patterns that are likely to be indicative of PI-associated data. For example, the database metadata rules may use regular expressions (e.g., sequences of characters that define search patterns). As discussed herein, PI-associated data may include one or more PI elements, and the one or more database metadata rules may be selected based on the one or more PI elements. Determining the at least one portion of the database metadata table associated with PI may include applying a database metadata rule to locate a certain pattern(s) within a column name(s), and/or a column description(s) stored in the database metadata table. For example, a PI element may be a name, and one or more database metadata rules may be configured to locate patterns of characters in the database metadata table indicative of a table, column, etc., associated with a name (e.g., a column labeled "Last_Name"). The patterns of characters the one or more database metadata rules are configured to locate in the database metadata table may be an exact match or a partial match (e.g., a fuzzy match). When the at least one portion of the database metadata table associated with the one or more PI elements is determined, a row entry may be written to a result table. The row entry may be indicative of the at least one portion of the database metadata table and a corresponding database(s) of the plurality of databases at which the data associated with the one or more PI elements is/are stored. For example, the row entry may include a database location, a database name, and/or a PI element(s) that is/are matched. In this way, the computing device may use the database metadata table to determine a location(s) of PI-associated data across the plurality of databases.

Turning now to FIG. 1, a block diagram of an example system 100 for improved data storage and data management is shown. The system 100 may include a computing device 102 and a plurality of data stores 106, 108, 110 each in communication with the computing device 102 via a network 104. Each of the plurality of data stores 106, 108, 110 may comprise one or more data storage mechanisms, such as a relational database, an in-memory data store, a log, or any other data storage repository configured for a retrieval interface. For ease of explanation, the plurality of data stores 106, 108, 110 may be referred to herein as a "plurality of databases." It is to be understood that any "database" referred to herein may comprise any type of suitable data storage mechanism.

The network 104 may facilitate communication between the plurality of data stores 106, 108, 110 and the computing device 102. The network 104 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent from any of the plurality of data stores 106, 108, 110 to the computing device 102 via a variety of transmission paths, including wireless paths (e.g., satellite paths, Wi-Fi paths, cellular paths, etc.) and terrestrial paths (e.g., wired paths, a direct feed source via a direct line, etc.). Additionally, data may be sent from the computing device 102 to any of the plurality of data stores 106, 108, 110 via a variety of transmission paths, including wireless paths and terrestrial paths.

The computing device 102 may include a plurality of collector modules 102A to 102N, an analyzer module 102B, and a central database 102C. While the computing device 102 is shown in FIG. 1 as having a collector module 102A and a collector module 102N, it is to be understood that the computing device 102 may include any number of collector modules. Further, each of the plurality of collector modules 102A to 102N may be resident on another computing device (not shown) in communication with the computing device 102. Additionally, while the computing device 102 is shown in FIG. 1 as having an analyzer module 102B, it is to be understood that the analyzer module 102B may be resident on another computing device (not shown) in communication with the computing device 102.

The plurality of data stores 106, 108, 110 may be part of a large data storage network consisting of numerous, disparate data stores. For example, the plurality of data stores 106, 108, 110 may be used by an enterprise to store customer data. The customer data may include sensitive information, such as personal information (PI). Each of the plurality of data stores 106, 108, 110 may include a database 106A, 108A, 110A, and a server 106B, 108B, 110B. Each server 106B, 108B, 110B may enable the computing device 102 to communicate with, and retrieve data from, the each of the databases 106A, 108A, 110A. Each of the databases 106A, 108A, 110A may be a different type of database. For example, the database 106 may be an Oracle™ database, while the database 108A may be a MySQL™ database.

The computing device 102 may locate PI-associated data stored at one or more of the plurality of data stores 106, 108, 110. PI-associated data may include one or more PI elements to be searched, such as, for example, a name; a date of birth; an age; a social security number; a gender; a height; a weight; a number of children; an address; an eye color; a language(s); a service address(es); an IP address(es); a MAC address(es); a serial number(s); a telephone number(s); a combination thereof, and/or the like. As described herein with respect to FIG. 2, the computing device 102 may determine which databases are to be searched. As described herein with respect to FIG. 3, the computing device 102 may receive database metadata from the databases that are searched. And, as described herein with respect to FIG. 5, the computing device 102 may use the database metadata and one or more database metadata rules to determine a location, or locations, of the PI-associated data.

Figure 2:
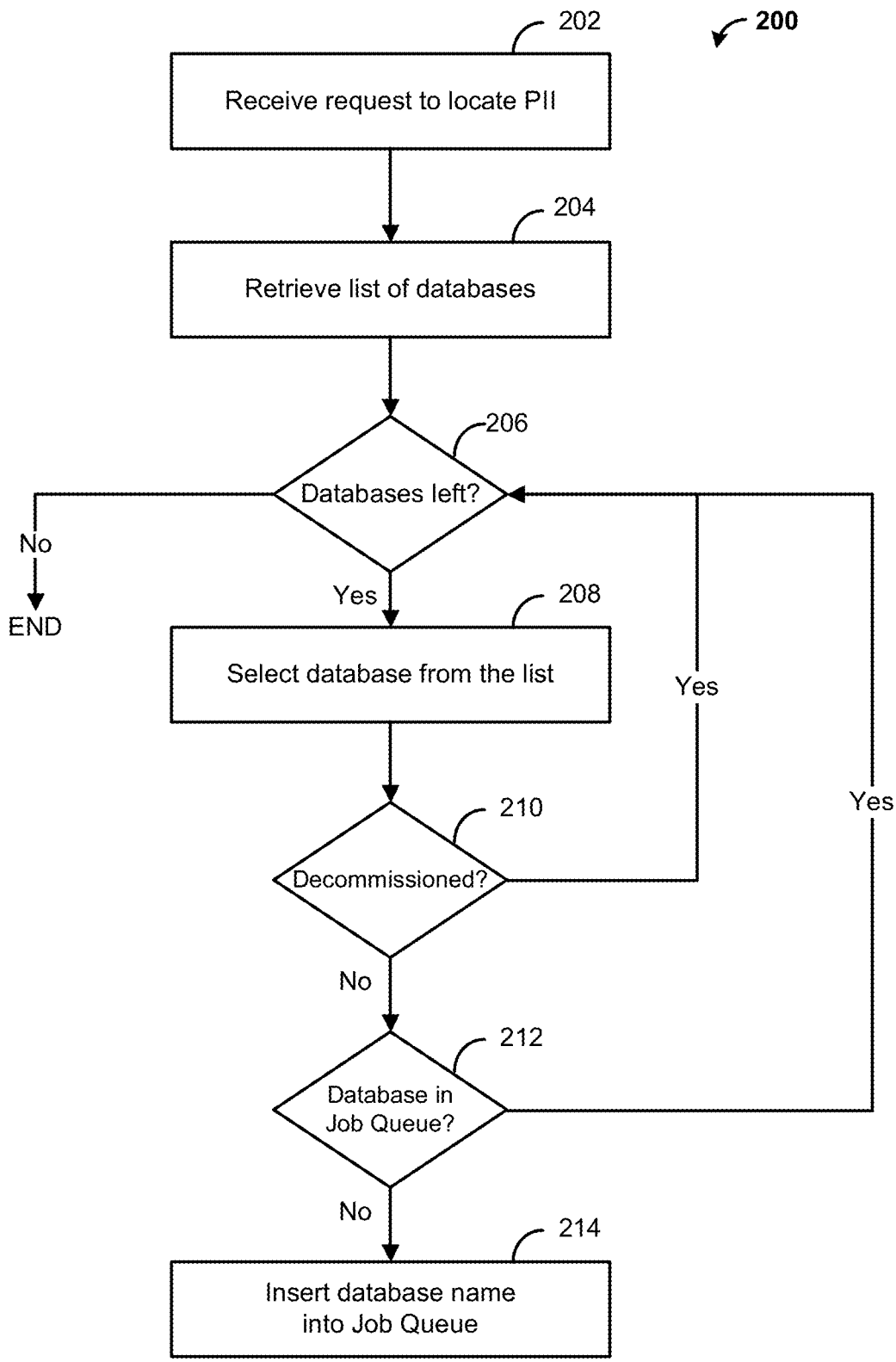
FIG. 2 shows an example process flowchart.

Turning, now to FIG. 2, an example workflow 200 for improved data storage and data management is shown. The workflow 200 may be implemented by the system 100 as part of locating PI-associated data. At step 202, the computing device 102 may be caused to locate PI-associated data. For example, the computing device 102 may be caused to locate PI-associated data in response to receiving a request from a user, an administrator, or other automated inventory discovery system. For example, an application administrator may wish to identify (e.g., scan) a number of data stores to identify all potential PI-associated data. As another example, an automated inventory system may determine that a new data store is not currently in a database inventory. The automated inventory discovery system may request that the new data store be scanned to locate PI-associated data. As a further example, a request may be received by the system 100 (e.g., via a user or administrator) to locate PI-associated data for a particular individual, a group of individuals, or any and all individuals.

At step 204, the computing device 102 may retrieve a list of databases to be searched. The computing device 102 may be associated with a database system of a large enterprise. The list of databases to be searched may comprise all databases, or a portion thereof, within the database system. For example, the computing device 102 may determine that each of the databases 106A, 108A, 110A are to be searched to locate the PI-associated data. At step 206, the computing device may determine whether any database on the list of databases to be searched has not been searched. For example, step 206 may be iteratively performed until each of the databases 106A, 108A, 110A are searched. Once all of the databases 106A, 108A, 110A have been searched, the workflow 200 would end at step 206. Otherwise, if the computing device 102 determines there are remaining databases in the list that have not been searched, then the workflow 200 continues at step 208, where a database is selected by the computing device 102 from the list. At step 210, the computing device 102 may determine whether the selected database is decommissioned. For example, the computing device 102 may determine whether the selected database is associated with a list of obsolete or duplicative databases. If the computing device 102 determines that the selected database is decommissioned (e.g., the selected database is on the list of obsolete or duplicative databases), then the workflow 200 returns to step 206. Otherwise, the workflow 200 continues at step 212, where the computing device 102 determines whether the selected database is in a job queue. It is to be understood that the computing device 102 may optionally determine, for example at step 204, whether any database in the retrieved list of databases to be searched is also listed in the list of obsolete or duplicative databases. The computing device 102 may modify, for example at step 204, the retrieved list of databases to be searched to remove any database that the computing device 102 determines is listed in the list of obsolete or duplicative databases. Returning to step 212, the job queue may comprise one or more databases from the list of databases that are to be searched to locate the PI-associated data. If the computing device 102 determines that the selected database is in the job queue at step 212, then the workflow 200 returns to step 206. Otherwise, the workflow 200 continues at step 214, where the selected database is added to the job queue. Once the selected database is added to the job queue, the workflow 200 returns to step 204 and the process iterates until all of the databases in the list to be searched have been considered (e.g., searched/analyzed) and added to the job queue as appropriate (e.g., databases that are not on the list of obsolete or duplicative databases may be added to job queue) by the computing device 102. Optionally, the computing device 102 may not consider (e.g., search/scan) one or more of the databases in the list based on suppression logic. For example, the suppression logic may inhibit the computing device 102 from considering (e.g., searching/scanning) one or more of the databases in the list for legal and/or regulatory reasons.

While the example workflow 200 has been described as being an iterative process, it is to be understood that the example workflow 200 may be implemented in a parallel fashion. For example, each of a plurality of computing devices, such as the computing device 102, may simultaneously—or nearly simultaneously—select a unique database from the list of databases to be searched. In this way, multiple databases within the list of databases to be searched may be considered more quickly and efficiently (e.g., searched/analyzed) and added to the job queue as appropriate.

Figure 3:
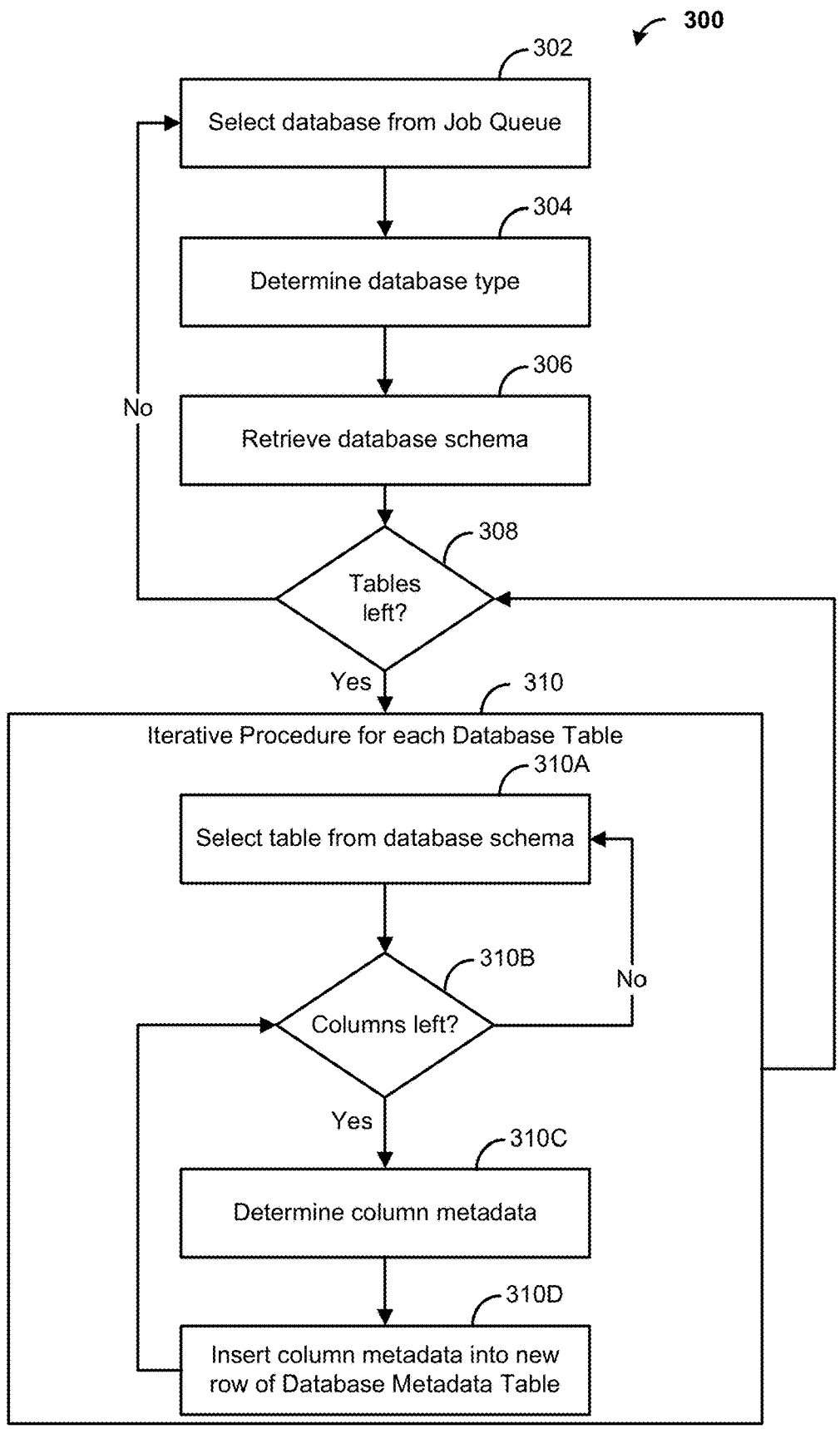
FIG. 3 shows an example process flowchart.

Turning, now to FIG. 3, an example workflow 300 for improved data storage and data management is shown. The workflow 300 may be implemented by the system 100 as part of locating PI-associated data. As discussed herein with respect to FIG. 2, the workflow 200 may iterate until the computing device 102 has added all of the databases in the list to the job queue. The workflow 300 describes how the computing device 102 uses the job queue to retrieve database metadata from each of the databases on the list. For ease of explanation, the description herein of the workflow 300 refers to the computing device 102 as the entity that performs the steps of the workflow 300; however, it is to be understood that another entity may perform the steps of the workflow 300. For example, another computing device(s), such as any of the servers 106B, 108B, 110B or another computing device(s) in communication with the computing device 102, may receive the job queue (or a portion thereof) from the computing device 102 and perform the steps of the workflow 300.

At step 302, the computing device 102 may select a database from the job queue. For example, the computing device 102 may select the database 106A from the job queue. At step 304, the computing device 102 may determine a database type associated with the selected database. The computing device 102 may determine the database type based on a database identifier associated with the selected database. For example, the computing device 102 may determine that the database 106A is an Oracle™ database based on a database identifier for the database 106A. As another example, the computing device 102 may determine the database type based on a configuration file associated with the database (e.g., a ".config" properties file). As a further example, the computing device 102 may determine the database type based on a method or other identification process known in the art (e.g., a JDBC method such as getDatabaseProductName( )). As described herein, each collector module of the plurality of collector modules 102A to 102N may be configured to communicate with a particular type of database (e.g., Oracle™, MySQL™, MongoDB™, etc.). For example, the computing device 102 may determine that the collector module 102A is configured to communicate with Oracle™ databases. The computing device may cause the collector module 102A to retrieve connection credentials for the database 106A. The connection credentials may be, for example, a username and/or a password, which may be required to communicate with the database 106A. The collector module 102A may provide the connection credentials to the computing device 102. The computing device 102 may use the connection credentials to establish a communication session with the database 106A. As another example, the computing device 102 may cause the collector module 102A to establish a communication session with database 106A.

At step 306, the communication session may be used by the computing device 102 and/or the collector module 102A to retrieve a database schema from the database 106A. During this process, no entries of data (e.g., rows of data) stored in the database 106A may be collected or sampled by the computing device 102 and/or the collector module 102A. The database schema may be indicative of a relationship structure employed by the database 106A. For example, the schema may indicate how one or more database tables of the database 106A are related by particular attribute(s). The schema may also indicate data table names, column names, column attribute datatypes, column descriptions, a combination thereof, and/or the like. The computing device 102 and/or the collector module 102A may create a list including the one or more database tables of the database 106A. At step 308, the computing device 102 and/or the collector module 102A may determine whether there are any tables any database on the list of databases has not been searched. For example, step 308 may be iteratively performed by the computing device 102 until each of the tables in the list are searched. Once all of the tables have been searched, the workflow 300 would return to step 302. Otherwise, if there are remaining tables in the list, the workflow 300 continues at step 310, where an iterative procedure may be performed with respect to each table of the one or more database tables of the database 106A.

At step 310A, a table may be selected from the list by the computing device 102 and/or the collector module 102A.

Figure 4:
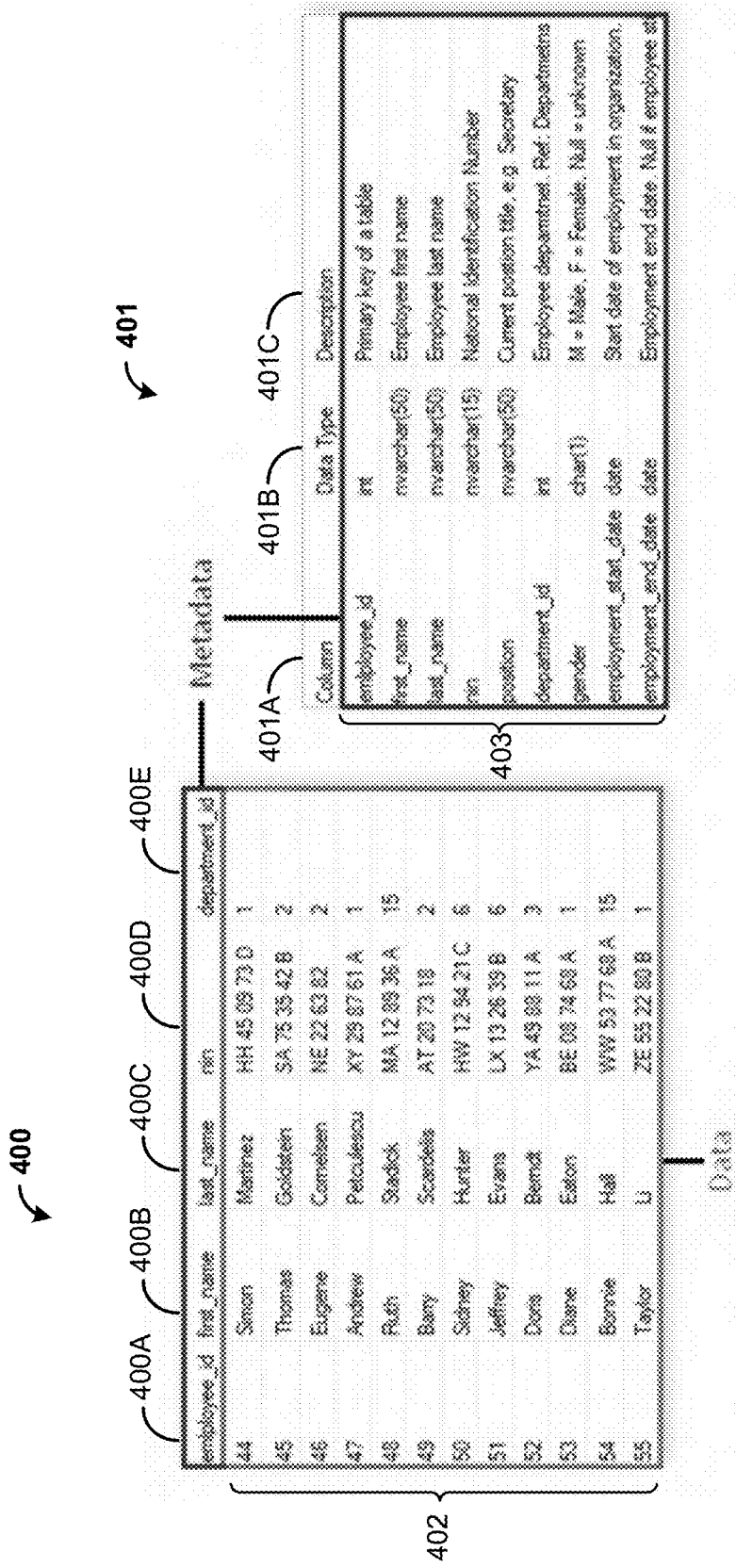
FIGS. 4A and 4B show example data tables.

The computing device 102 and/or the collector module 102A may loop over each column in the selected table. Therefore, at step 310B, the computing device 102 and/or the collector module 102A may determine whether there are any remaining columns in the selected table that have not been looped over. If there are no remaining columns, then the iterative procedure returns to step 310A. Otherwise, the procedure continues at step 310C, where a column is selected and column metadata is determined by the computing device 102 and/or the collector module 102A. The column metadata may include a column name, a column attribute datatype(s), a column description(s), a combination thereof, and/or the like. For example, FIG. 4A shows an example database table 400. The column metadata for column 400A may include the column name, "employee_ID." As shown in FIG. 4A, the table may include entries of data 402. In determining the column metadata for the column 400A, the entries of data 402 may not be searched, retrieved, copied, etc.

Returning to FIG. 3, at step 310D, the computing device 102 and/or the collector module 102A may add the column metadata for the selected column to a database metadata table. The database metadata table may be generated by the computing device 102 and/or the collector module 102A. The database metadata table may be stored by the computing device 102 and/or the collector module 102A in the central database 102C of the computing device 102. The computing device 102 and/or the collector module 102A may add the column metadata for the selected column to the database metadata table as part of an aggregation process. For example, the computing device 102 and/or the collector module 102A may convert, or otherwise standardize, the column metadata into a common format. The converted/standardized column metadata may be stored as one or more rows of data in the database metadata table. For example, the one or more rows of data may include one or more of the following: a data table name, a column name, a column attribute datatype, or a column description. Each row of the database metadata table may be further indicative of an identifier for the particular database associated with the database metadata stored in that row. An example of a database metadata table is shown as table 401 in FIG. 4B. The database metadata table 401 may include a first column 401A for listing column names; a column 401B for listing a data type(s); and a column 401C for listing a column description. The converted/standardized column metadata may be stored in the database metadata table 401 as one or more rows of data 403. As an example, the column metadata may be stored in the first row of the database metadata table 401, and the column metadata may include a column name of "employee_ID;" a data type of "int" (e.g., integer); and a description of "Primary key of a table."

The database metadata table 401 may be generated by the computing device 102 and stored in a database separate from the databases 106A, 108A, 110A. For example, the database metadata table 401 may be stored in the central database 102C of the computing device 102. As described herein, the database metadata table 401 may comprise one or more rows of data 403. Each row of the database metadata table 401 may be associated with a row identifier (e.g., Row 1, Row A, etc.) and correspond to a record of database metadata (e.g., a record of column metadata). As described herein, the database metadata table 401 may comprise a plurality of columns 401A, 401B, 401C that intersect the one or more rows of data 403 to define a plurality of cells as shown in FIG. 4B. Each column of the plurality of columns 401A, 401B, 401C may be associated with a column identifier (e.g., Column 1, Column A, etc.) and correspond to a portion of the database metadata (e.g., a column name, a data type, a description, etc.). Each row identifier may comprise column information indicative of one or more of the plurality of columns 401A, 401B, 401C associated with the row (e.g., indicative of one or more portions of the database metadata associated with the row). In this way, each row and each column of the database metadata table 401 may be logically associated, thereby enabling the computing device 102 to quickly and efficiently access the database metadata table 401 (or portions thereof).

Returning to FIG. 3, the iterative procedure performed at step 310 of the workflow 300 may then return to step 310B, and the iterative procedure may be repeated until each of the columns in the selected table have been looped over. Once all of the columns in the selected table have been looped over, the iterative procedure may return to step 310A, where a next table of the of the one or more database tables of the database 106A is selected, and the iterative procedure may be repeated until each of the tables have been processed. Once all of the tables of the one or more database tables of the database 106A have been processed, the workflow 300 may follow the "no" path of step 308 and return to step 302, where a next a database from the job queue may be selected. The workflow 300 may therefore repeat until all of the databases in the job queue have been processed. In this way, the database metadata table may be populated with database metadata (e.g., column metadata) for each column of each table of each of the databases 106A, 108A, 110A.

While the example workflow 300 has been described as being an iterative process, it is to be understood that the example workflow 300 may be implemented in a parallel fashion. For example, each collector module of the plurality of collector modules 102A to 102N may simultaneously—or nearly simultaneously—select a unique database from the job queue. In this way, multiple databases within the job queue may be considered (e.g., searched/analyzed) at any one time, and corresponding column metadata from each of the databases in the job queue may be quickly and efficiently stored in the database metadata table 401.

Figure 5:
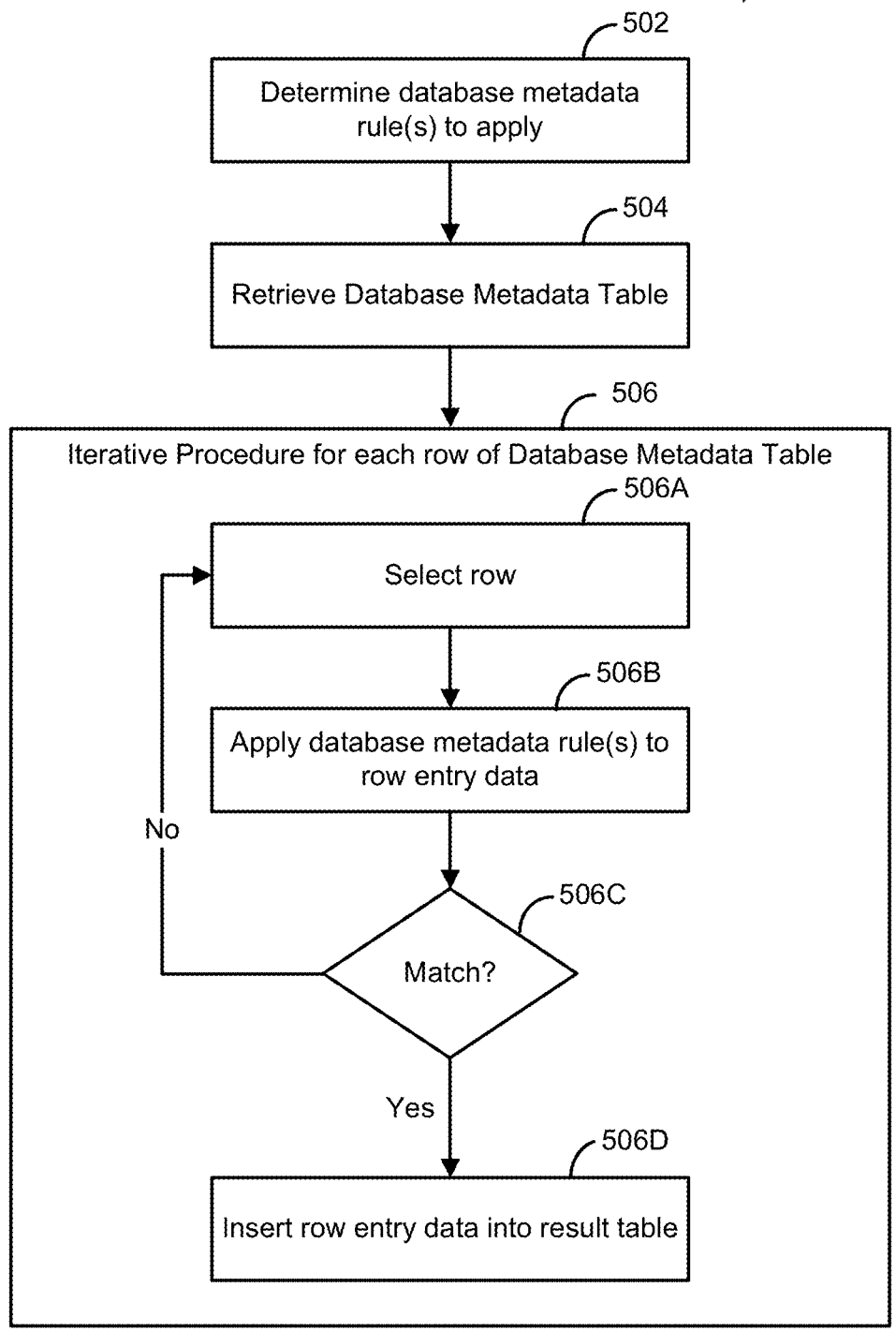
FIG. 5 shows an example process flowchart.

Turning, now to FIG. 5, an example workflow 500 for improved data storage and data management is shown. The workflow 500 may be implemented by the system 100 as part of fulfilling locating PI-associated data. As discussed herein with respect to FIGS. 2 and 3, the workflow 200 may iterate until all of the databases in the list have been added to the job queue, and the workflow 300 may iterate in order to populate the database metadata table 401 with database metadata (e.g., column metadata) for each column of each table of each of the databases 106A, 108A, 110A. The workflow 500 describes how the analyzer module 102B of the computing device 102 applies one or more database metadata rules to the database metadata table 401 in order to determine at least one portion of the database metadata table 401 that may be associated with PI. In one example, the database metadata rules may be configured to locate certain character patterns that are likely to be indicative of PI-associated data.

At step 502, the database metadata rule(s) to be applied may be selected by the analyzer module 102B. For example, the database metadata rule(s) to be applied may be selected by the analyzer module 102B based on a request to locate PI-associated data for a particular individual, or individuals. As discussed herein, the request may include one or more PI elements to be searched, and the one or more database metadata rules may be selected based on the one or more PI elements. A PI element may comprise full or partial data. For example, a PI element may contain a birth year, rather than a full birthdate, a PI element may contain a last name, rather than a full name, a PI element may contain a partial social security number, rather than a full social security number, and the like. At step 504, the database metadata table 401 may be retrieved by the analyzer module 102B. The analyzer module 102B may then perform an iterative procedure at step 506 in order to determine at least one portion of the database metadata table 401 associated with PI. For example, the analyzer module 102B may determine the at least one portion of the database metadata table 401 associated with PI by applying a database metadata rule to locate a certain pattern(s) within a column name(s), a column attribute datatype(s), and/or a column description(s) stored in the database metadata table 401.

At step 506A, the analyzer module 102B may select a row of the database metadata table 401. For example, the analyzer module 102B may select the second row of the table 401 in FIG. 4B. At step 506B, the analyzer module 102B may apply a database metadata rule to the data stored in the selected row. For example, the applied database metadata rule may be configured to locate patterns of characters in the data stored in the selected row indicative of a name or a label associated with a name. As another example, the column metadata stored in a row of the database metadata table 401 may include a column name of "employee_ID;" a data type of "int" (e.g., integer); and a description of "Primary key of a table." Accordingly, the applied database metadata rule may be configured to locate patterns of characters containing "employee," "int," and/or "primary key." At step 506C, the analyzer module 102B may determine whether there is a match in the selected row. The patterns of characters the database metadata rule is configured to locate in the selected row may be an exact match or a partial match (e.g., a fuzzy match). Using the example above, the analyzer module 102B may apply the database metadata rule and determine that a match exists in the second row of the table 401 in FIG. 4B (e.g., column name of "last_name" and/or description of "Employee last name").

In some examples, the database metadata rules may be configured to utilize an ontology and/or a thesaurus at step 506C when determining whether there is a match in the selected row of the database metadata table 401. For example, the computing device 102 may parse a request to locate PI-associated data for a particular individual, a group of individuals, or any and all individuals. The computing device 102 may use the ontology and/or the thesaurus to develop a list of related terms, concepts, and/or contexts that may correlate to the request—or portions thereof. For example, the request may comprise a natural language portion, including words, names, and/or phrases, such as "John Smith; Apr. 9, 1986; Georgia." The natural language portion of the request may be parsed and the computing device 102 may use the ontology and/or the thesaurus to determine a list of related terms, concepts, and/or contexts that may correlate to each natural language portion of the request (e.g., "John," "Smith," "Apr. 9, 1986," and "Georgia"). The list of related terms, concepts, and/or contexts may be column names. As an example, the ontology and/or the thesaurus may indicate that "John" is associated with column names including "first" and "name" (e.g., first_name, name_First, etc.) and/or other words/phrases that are associated with the concept of a first name. In this way, the computing device 102 may use the ontology and/or the thesaurus to determine whether there is a match in the selected row of the database metadata table 401 (e.g., a cell within the selected row) containing a column name(s) including "first" and "name" (e.g., first_name, name_First, etc.) and/or other words/phrases that are associated with the concept of a first name. The computing device 102 may use the ontology and/or the thesaurus to determine whether there is a match in the selected row of the database metadata table 401 corresponding to each natural language portion of the request (e.g., each word, name, and/or phrase).

When a match is determined to exist in the selected row, the iterative procedure may proceed to step 506D, where the data stored in the selected row is inserted into a result table. The data stored in the result table may be indicative of the at least one portion of the database metadata table 401 associated with the one or more PI elements as well as a corresponding database(s) of the databases 106A, 108A, 110A at which the data associated with the one or more PI elements is/are stored. For example, a row of the result table may include a database location, a database name, and/or a PI element(s) that is/are matched.

As another example, the row of the result table may include a flag or other identifier to indicate what type of match was determined. The types of possible matches may include, for example, an exact match, a partial match, or a manual match. An exact match may be determined when the applied database metadata rule locates a pattern of characters in the selected row that corresponds one-to-one with the particular pattern of characters for which the applied database metadata rule is configured to locate. A partial match may be determined when the applied database metadata rule locates a pattern of characters in the selected row that partially corresponds with the particular pattern of characters for which the applied database metadata rule is configured to locate (e.g., 50% or more of the particular pattern is located). A manual match may be determined when the applied database metadata rule cannot locate a pattern of characters in the selected row that corresponds with the particular pattern of characters for which the applied database metadata rule is configured to locate (e.g., an administrator of the system 100 manually determines an exact or partial match is located).

The result table may be generated by the computing device 102 and stored in a database separate from the databases 106A, 108A, 110A. For example, the result table may be stored in the central database 102C of the computing device 102. The result table may be provided by the analyzer module 102B to another computing device (e.g., a computing device associated with an initiation of a request for PI-associated data). The result table may be used by the computing device 102 to generate a PI data map. As described herein, the computing device 102 may use the ontology and/or the thesaurus to determine whether there is a match in a selected row of the database metadata table 401 corresponding to each natural language portion of a request (e.g., each word, name, and/or phrase). The natural language portion of the request may be parsed, and the computing device 102 may use the ontology and/or the thesaurus to determine a list of related terms, concepts, and/or contexts that may correlate to each natural language portion of the request. The PI data map may reference portions of the result table corresponding to the list of related terms, concepts, and/or contexts. For example, the natural language portion of the request may include "John," and the ontology and/or the thesaurus may indicate that "John" is associated with column names including "first" and "name" (e.g., first_name, name_First, etc.) and/or other words/phrases that are associated with the concept of a first name. The PI data map may therefore reference portions of the result table corresponding to column names including "first" and "name" (e.g., first_name, name_First, etc.) and/or other words/phrases that are associated with the concept of a first name. In this way, the computing device 102 may quickly and efficiently process other request(s) having a natural language portion associated with the concept of a first name.

Returning to step 506C, if it is determined that a match does not exist in the selected row, then the iterative procedure may return to step 506A, where the analyzer module 102B may select another row of the database metadata table 401 (e.g., a previously un-processed row). In this way, the iterative procedure at step 506 may be repeated for each row of the database metadata table 401 in order to populate the result table with information indicative of a location(s) where PI-associated data is stored in the system 100.

While the example workflow 500 has been described as being an iterative process, it is to be understood that the example workflow 500 may be implemented in a parallel fashion. For example, the analyzer module 102B of the computing device 102 may simultaneously—or nearly simultaneously—apply the one or more database metadata rules to the database metadata table 401 in order to determine at least one portion of the database metadata table that may be associated with PI. As another example, each of a plurality of analyzer modules, such as the analyzer module 102B, may simultaneously—or nearly simultaneously—apply one or more database metadata rules to the database metadata table 401 in order to determine at least one portion of the database metadata table that may be associated with PI. In this way, multiple database metadata rules may be applied to the database metadata table 401 at any one time.

As described herein, the result table may be provided by the analyzer module 102B to another computing device, such as a computing device associated with an initiation of a request for PI-associated data. Additionally, or in the alternative, the computing device 102 may be the computing device associated with the initiation of the request. For ease of explanation, the computing device 102 will be described as the computing device associated with the initiation of the request; however, it is to be understood that another computing device may be the computing device associated with the initiation (and/or processing) of the request.

The computing device 102 may use the result table and/or the PI data map to fulfill one or more requests for PI-associated data. For example, the computing device may receive a request that PI-associated data for a particular individual—or a number of individuals—(hereinafter, the "requesting party") be located and/or provided. Requirements related to fulfillment of the request may vary by jurisdiction (e.g., municipality, state, region, country, etc.), and the computing device 102 may be configured accordingly. For example, the request may be to locate and/or provide PI-associated data relating to the requesting party. The requesting party may a resident of, or otherwise subject to the jurisdiction of, the State of California. In such a scenario, what constitutes PI-associated data may be defined by legislation/regulation such as the California Consumer Privacy Act ("CCPA"). The CCPA may define PI-associated data broadly, such as including anything that identifies, relates to, describes, is capable of being associated with, or could be reasonably linked, directly or indirectly, with the requesting party. As another example, the requesting party may a resident of, or otherwise subject to the jurisdiction of, the European Union. In such a scenario, what constitutes PI-associated data may be defined by legislation/regulation such as the General Data Protection Regulation ("GDPR"). The GDPR may define PI-associated data broadly, such as any piece of information that relates to an identifiable person. As a further example, the requesting party may a resident of, or otherwise subject to the jurisdiction of, a municipality, state, region, country, etc., having legislation/regulation that defines PI-associated data as being any set of information that uniquely identifies a person (e.g., first name, last name, and address). Other examples of jurisdictional requirements are possible as well. The computing device 102 may be configured to comply with such jurisdictional requirements, regardless of their breadth. Therefore, fulfillment of the request by the computing device 102 for the same requesting party may vary by jurisdiction. Depending on the jurisdiction, fulfillment of the request may include as much as locating and/or providing nearly all PI-associated data relating to the requesting party or as little as locating and/or providing an address corresponding to a full name of the requesting party.

Figure 6:
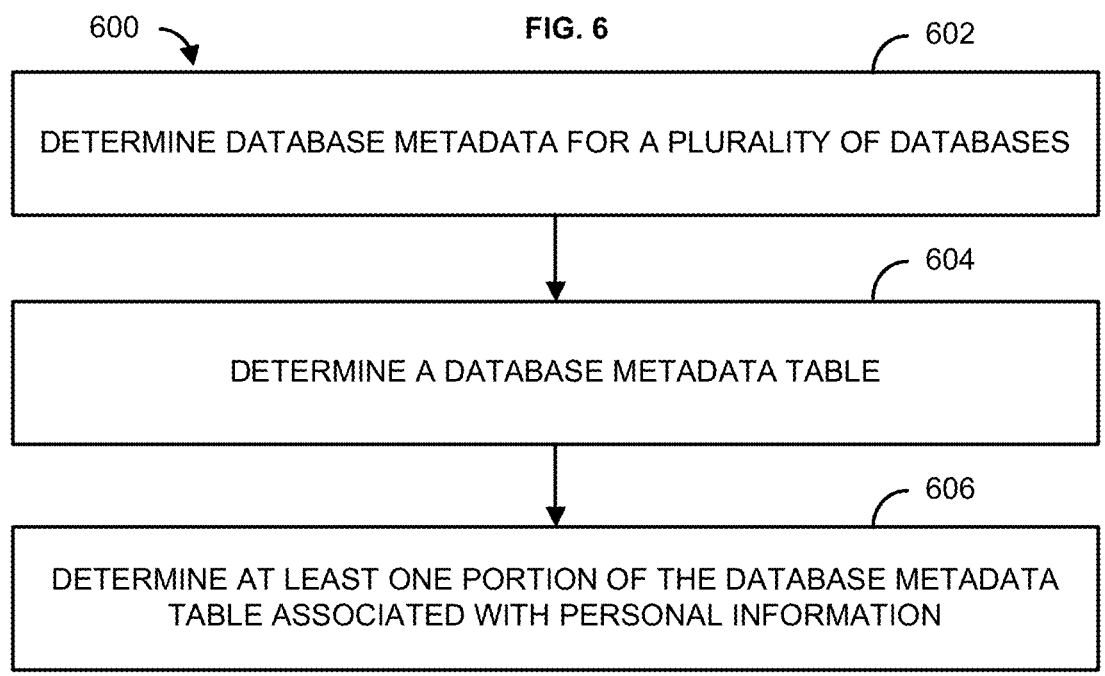
FIG. 6 shows an example method.

Turning now to FIG. 6, an example method 600 for improved data storage and data management is shown. The method 600 may be performed by the computing device 102, one or more of the collector modules 102A, 102N, and/or the analyzer module 102B of FIG. 1. One or more steps of the method 600 may incorporate one or more steps of the workflow 200 shown in FIG. 2, the workflow 300 shown in FIG. 3, or the workflow 500 shown in FIG. 5.

For example, a computing device may locate data associated with personal information (PI). The computing device may determine that a plurality of databases are to be searched to locate the PI-associated data. The computing device may select at least one of the plurality of databases from a job queue. The computing device may determine a database type associated with the at least one database. For example, the computing device may determine that the at least one database is an Oracle™ database. Each of a plurality of collector modules may be configured to communicate with a particular type of database (e.g., Oracle™, MySQL™, MongoDB™, etc.). The plurality of collector modules may be resident on the computing device or otherwise under the control of the computing device. The computing device may determine that at least one of the plurality of collector modules is configured to communicate with Oracle™ databases. The computing device may cause that at least one collector module to retrieve connection credentials for the at least one database. The connection credentials may be, for example, a username and/or a password, which may be required to communicate with the at least one database. The at least one collector module may provide the connection credentials to the computing device. The computing device may use the connection credentials to establish a communication session with the at least one database. As another example, the computing device may cause the at least one collector module to establish a communication session with database. This process may be repeated for each of the plurality of databases such that the computing device may be in communication with the plurality of databases (e.g., either directly or indirectly via the plurality of collector modules).

At step 602, the computing device may determine database metadata for each database of the plurality of databases. For example, a communication session may be used by the computing device and/or each collector module of the plurality of collector modules to retrieve a database schema from each database of the plurality of databases. During this process, no entries of data (e.g., rows of data) stored in the plurality of databases may be collected or sampled by the computing device and/or the plurality of collector modules. Each database schema may be indicative of a relationship structure employed by each database of the plurality of databases. For example, a database schema may indicate how one or more database tables of a database of the plurality of databases are related by particular attribute(s). A database schema may also indicate data table names, column names, column attribute datatypes, column descriptions, a combination thereof, and/or the like.

The computing device and/or the plurality of collector modules may loop through each of the one or more database tables of each of the plurality of databases in order to receive (e.g., retrieve) the database metadata for each of the plurality of databases. For example, a table may be selected from a list of database tables for at least one database of the plurality of databases by the computing device and/or at least one of the plurality of collector modules. The computing device and/or the at least one collector module may loop over each column in the selected table to determine column metadata. The column metadata may include a column name, a column attribute datatype(s), a column description(s), a combination thereof, and/or the like.

At step 604, the computing device or the plurality of collector modules may determine/populate a database metadata table. For example, the computing device and/or the at least one collector module may add the column metadata for the selected column to the database metadata table. The database metadata table may be stored in a central database of the computing device. The computing device and/or the at least one collector module may add the column metadata for the selected column to the database metadata table as part of an aggregation process. For example, the computing device and/or the at least one collector module may convert, or otherwise standardize, the column metadata into a common format. The converted/standardized column metadata may be stored as one or more rows of data in the database metadata table. The one or more rows of data may include one or more of the following: a data table name, a column name, a column attribute datatype, or a column description. Each row of the database metadata table may be further indicative of an identifier for the particular database associated with the database metadata stored in that row.

Each of the columns in the selected table may be looped over to determine column metadata for each. Once all of the columns in the selected table have been looped over, a next table of the of the one or more database tables of the at least one database may be selected, and the aforementioned procedure may be repeated until each of the tables have been processed. Once all of the tables of the one or more database tables of the at least one database have been processed, a next a database from the plurality of databases may be selected. The aforementioned procedure may therefore repeat until all of the plurality of databases have been processed. In this way, the database metadata table may be populated with database metadata (e.g., column metadata) for each column of each table of each of the plurality of databases.

At step 606, one or more database metadata rules may be used to determine at least one portion of the database metadata table that may be associated with PI. For example, an analyzer module of the computing device may apply the one or more database metadata rules to the database metadata table in order to determine the at least one portion of the database metadata table that may be associated with PI. The database metadata rules may be configured to locate certain character patterns that are likely to be indicative of PI-associated data. The database metadata rule(s) to be applied may be selected by the analyzer module.

For example, the database metadata rule(s) to be applied may be selected by the analyzer module based on a request to locate PI-associated data for a particular individual, a group of individuals, or any and all individuals. The request may include one or more PI elements to be searched, and the one or more database metadata rules may be selected based on the one or more PI elements. The database metadata table may be retrieved by the analyzer module. The analyzer module may then perform an iterative procedure in order to determine the at least one portion of the database metadata table associated with PI. For example, the analyzer module may determine the at least one portion of the database metadata table associated with PI by applying one or more of the database metadata rules to one or more rows of the database metadata table in order to locate a certain pattern(s) within a column name(s), a column attribute datatype(s), and/or a column description(s) stored in the database metadata table.

The analyzer module may determine whether there is a match in the one or more rows of the database metadata table. The patterns of characters that the one or more database metadata rules are configured to locate in the one or more rows of the database metadata table may be an exact match or a partial match (e.g., a fuzzy match). When a match is determined to exist in the one or more rows of the database metadata table, the data stored in the one or more rows of the database metadata table may be inserted into a result table. The data stored in the result table may be indicative of the at least one portion of the database metadata table associated with the one or more PI elements as well as a corresponding database identifier(s) for one or more of the plurality of databases at which the data associated with the one or more PI elements is/are stored.

For example, a row of the result table may include a database location, a database name, and/or a PI element(s) that is/are matched. As another example, the row of the result table may include a flag or other identifier to indicate what type of match was determined. The types of possible matches may include, for example, an exact match, a partial match, or a manual match. An exact match may be determined when the applied database metadata rule locates a pattern of characters in the selected row that corresponds one-to-one with the particular pattern of characters for which the applied database metadata rule is configured to locate. A partial match may be determined when the applied database metadata rule locates a pattern of characters in the selected row that partially corresponds with the particular pattern of characters for which the applied database metadata rule is configured to locate (e.g., 50% or more of the particular pattern is located). A manual match may be determined when the applied database metadata rule cannot locate a pattern of characters in the selected row that corresponds with the particular pattern of characters for which the applied database metadata rule is configured to locate (e.g., an administrator manually determines an exact or partial match is located).

The result table may be generated by the computing device and stored in a database separate from the plurality of databases. For example, the result table may be stored in a central database of the computing device. The result table may be provided by the analyzer module to another computing device (e.g., a computing device associated with an initiation of a request for PI-associated data).

Figure 7:
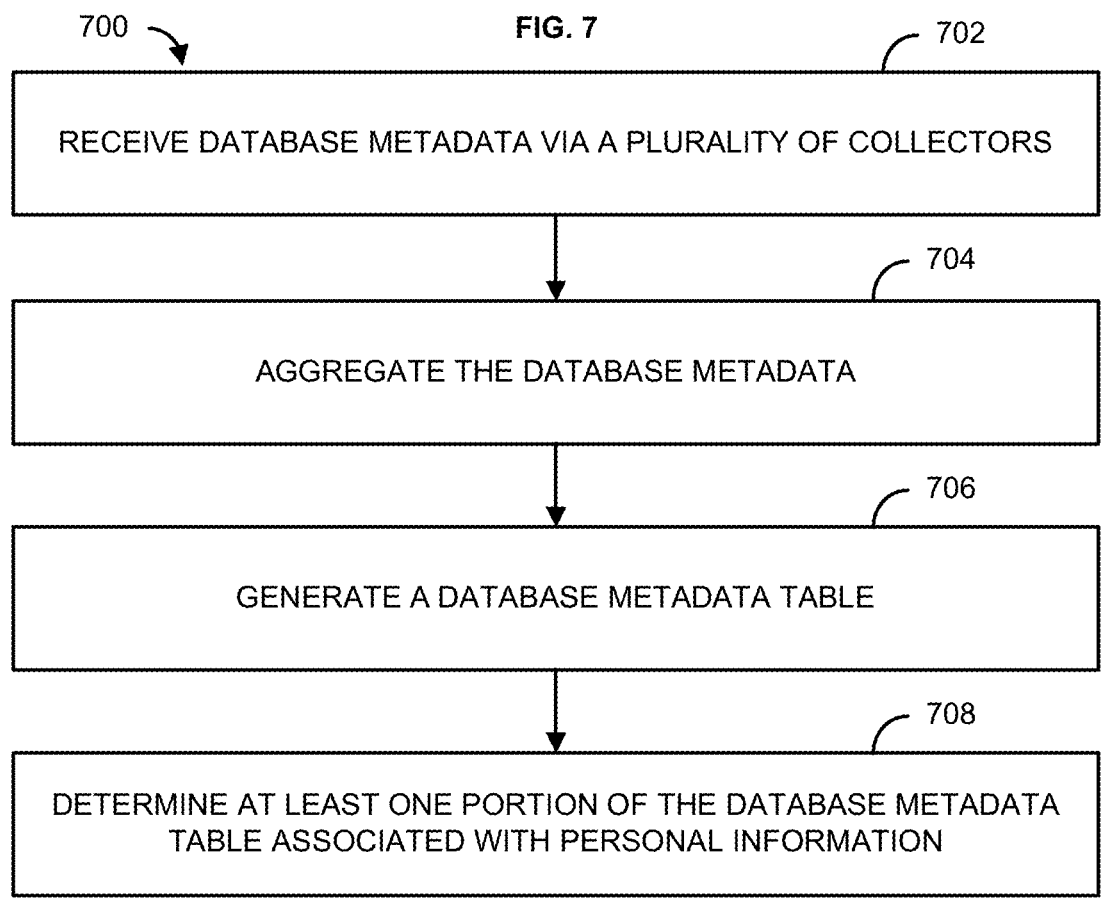
FIG. 7 shows an example method.

Turning now to FIG. 7, an example method 700 for improved data storage and data management is shown. The method 700 may be performed by the computing device 102, one or more of the collector modules 102A, 102N, and/or the analyzer module 102B of FIG. 1. One or more steps of the method 700 may incorporate one or more steps of the workflow 200 shown in FIG. 2, the workflow 300 shown in FIG. 3, or the workflow 500 shown in FIG. 5.

For example, a computing device may locate data associated with personal information (PI). The computing device may determine that a plurality of databases are to be searched to locate the PI-associated data. The computing device may select at least one of the plurality of databases from a job queue. The computing device may determine a database type associated with the at least one database. For example, the computing device may determine that the at least one database is an Oracle™ database. Each of a plurality of collector modules may be configured to communicate with a particular type of database (e.g., Oracle™, MySQL™, MongoDB™, etc.). The plurality of collector modules may be resident on the computing device or otherwise under the control of the computing device. The computing device may determine that at least one of the plurality of collector modules is configured to communicate with Oracle™ databases.

The computing device may cause that at least one collector module to retrieve connection credentials for the at least one database. The connection credentials may be, for example, a username and/or a password, which may be required to communicate with the at least one database. The at least one collector module may provide the connection credentials to the computing device. The computing device may use the connection credentials to establish a communication session with the at least one database. As another example, the computing device may cause the at least one collector module to establish a communication session with database. This process may be repeated for each of the plurality of databases such that the computing device may be in communication with the plurality of databases (e.g., either directly or indirectly via the plurality of collector modules).

At step 702, the computing device may receive database metadata associated with the plurality of databases. The computing device may receive the database metadata associated with the plurality of databases via the plurality of collector modules. Each collector module of the plurality of collector modules may retrieve database metadata from at least one database of the plurality of databases. For example, a communication session may be used by the computing device and/or each collector module of the plurality of collector modules to retrieve a database schema from each database of the plurality of databases. During this process, no entries of data (e.g., rows of data) stored in the plurality of databases may be collected or sampled by the computing device and/or the plurality of collector modules. Each database schema may be indicative of a relationship structure employed by each database of the plurality of databases. For example, a database schema may indicate how one or more database tables of a database of the plurality of databases are related by particular attribute(s). A database schema may also indicate data table names, column names, column attribute datatypes, column descriptions, a combination thereof, and/or the like.

The computing device and/or the plurality of collector modules may loop through each of the one or more database tables of each of the plurality of databases in order to receive (e.g., retrieve) the database metadata for each of the plurality of databases. For example, a table may be selected from a list of database tables for at least one database of the plurality of databases by the computing device and/or at least one of the plurality of collector modules. The computing device and/or the at least one collector module may loop over each column in the selected table to determine column metadata. The column metadata may include a column name, a column attribute datatype(s), a column description(s), a combination thereof, and/or the like.

At step 704, an analyzer module of the computing device may aggregate the database metadata associated with the plurality of databases. For example, the analyzer module may convert, or otherwise standardize, the column metadata into a common format. At step 706, the analyzer module may generate a database metadata table based on the aggregated database metadata. For example, the converted and/or standardized column metadata may be stored as one or more rows of data in the database metadata table. As another example, the analyzer module and/or the at least one collector module may add the column metadata for the selected column to the database metadata table. The database metadata table may be stored in a central database of the computing device. The one or more rows of data may include one or more of the following: a data table name, a column name, a column attribute datatype, or a column description. Each row of the database metadata table may be further indicative of an identifier for the particular database associated with the database metadata stored in that row.

Each of the columns in the selected table may be looped over to determine column metadata for each. Once all of the columns in the selected table have been looped over, a next table of the of the one or more database tables of the at least one database may be selected, and the aforementioned procedure may be repeated until each of the tables have been processed. Once all of the tables of the one or more database tables of the at least one database have been processed, a next a database from the plurality of databases may be selected. The aforementioned procedure may therefore repeat until all of the plurality of databases have been processed. In this way, the database metadata table may be populated with database metadata (e.g., column metadata) for each column of each table of each of the plurality of databases.

At step 708, one or more database metadata rules may be used to determine at least one portion of the database metadata table that may be associated with PI. For example, the analyzer module of the computing device may apply the one or more database metadata rules to the database metadata table in order to determine the at least one portion of the database metadata table that may be associated with PI. The database metadata rules may be configured to locate certain character patterns that are likely to be indicative of PI-associated data. The database metadata rule(s) to be applied may be selected by the analyzer module.

For example, the database metadata rule(s) to be applied may be selected by the analyzer module based on a request to locate PI-associated data for a particular individual, a group of individuals, or any and all individuals. The request may include one or more PI elements to be searched, and the one or more database metadata rules may be selected based on the one or more PI elements. The database metadata table may be retrieved by the analyzer module. The analyzer module may then perform an iterative procedure in order to determine the at least one portion of the database metadata table associated with PI. For example, the analyzer module may determine the at least one portion of the database metadata table associated with PI by applying one or more of the database metadata rules to one or more rows of the database metadata table in order to locate a certain pattern(s) within a column name(s), a column attribute datatype(s), and/or a column description(s) stored in the database metadata table.

The analyzer module may determine whether there is a match in the one or more rows of the database metadata table. The patterns of characters that the one or more database metadata rules are configured to locate in the one or more rows of the database metadata table may be an exact match or a partial match (e.g., a fuzzy match). When a match is determined to exist in the one or more rows of the database metadata table, the data stored in the one or more rows of the database metadata table may be inserted into a result table. The data stored in the result table may be indicative of the at least one portion of the database metadata table associated with the one or more PI elements as well as a corresponding database identifier(s) for one or more of the plurality of databases at which the data associated with the one or more PI elements is/are stored.

For example, a row of the result table may include a database location, a database name, and/or a PI element(s) that is/are matched. As another example, the row of the result table may include a flag or other identifier to indicate what type of match was determined. The types of possible matches may include, for example, an exact match, a partial match, or a manual match. An exact match may be determined when the applied database metadata rule locates a pattern of characters in the selected row that corresponds one-to-one with the particular pattern of characters for which the applied database metadata rule is configured to locate. A partial match may be determined when the applied database metadata rule locates a pattern of characters in the selected row that partially corresponds with the particular pattern of characters for which the applied database metadata rule is configured to locate (e.g., 50% or more of the particular pattern is located). A manual match may be determined when the applied database metadata rule cannot locate a pattern of characters in the selected row that corresponds with the particular pattern of characters for which the applied database metadata rule is configured to locate (e.g., an administrator manually determines an exact or partial match is located).

The result table may be generated by the computing device and stored in a database separate from the plurality of databases. For example, the result table may be stored in a central database of the computing device. The result table may be provided by the analyzer module to another computing device (e.g., a computing device associated with an initiation of a request for PI-associated data).

Figure 8:
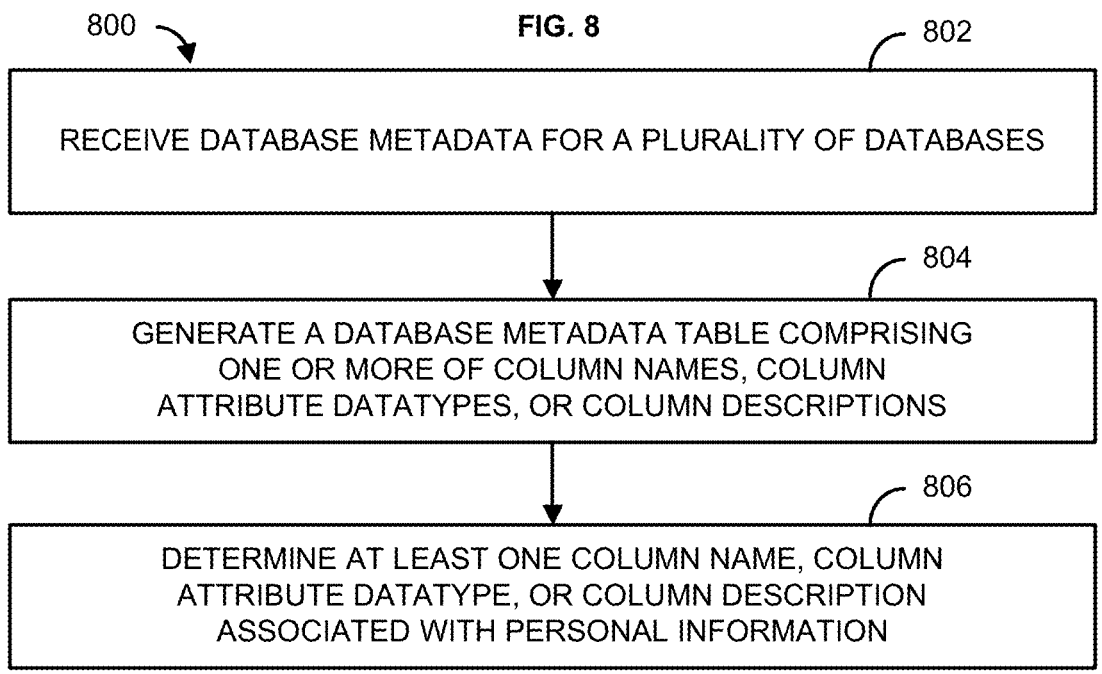
FIG. 8 shows an example method.

Turning now to FIG. 8, an example method 800 for improved data storage and data management is shown. The method 800 may be performed by the computing device 102, one or more of the collector modules 102A, 102N, and/or the analyzer module 102B of FIG. 1. One or more steps of the method 800 may incorporate one or more steps of the workflow 200 shown in FIG. 2, the workflow 300 shown in FIG. 3, or the workflow 500 shown in FIG. 5.

For example, a computing device may locate data associated with personal information (PI). The computing device may determine that a plurality of databases are to be searched to locate the PI-associated data. The computing device may select at least one of the plurality of databases from a job queue. The computing device may determine a database type associated with the at least one database. For example, the computing device may determine that the at least one database is an Oracle™ database. Each of a plurality of collector modules may be configured to communicate with a particular type of database (e.g., Oracle™, MySQL™, MongoDB™, etc.).

The plurality of collector modules may be resident on the computing device or otherwise under the control of the computing device. The computing device may determine that at least one of the plurality of collector modules is configured to communicate with Oracle™ databases. The computing device may cause that at least one collector module to retrieve connection credentials for the at least one database. The connection credentials may be, for example, a username and/or a password, which may be required to communicate with the at least one database. The at least one collector module may provide the connection credentials to the computing device. The computing device may use the connection credentials to establish a communication session with the at least one database. As another example, the computing device may cause the at least one collector module to establish a communication session with database. This process may be repeated for each of the plurality of databases such that the computing device may be in communication with the plurality of databases (e.g., either directly or indirectly via the plurality of collector modules).

At step 802, the computing device may receive database metadata from the at least one database. For example, a communication session may be used by the computing device and/or each collector module of the plurality of collector modules to retrieve a database schema from the at least one database of the plurality of databases. During this process, no entries of data (e.g., rows of data) stored in the at least one database may be collected or sampled by the computing device and/or the plurality of collector modules. The database schema may be indicative of a relationship structure employed by the at least one database. For example, the database schema may indicate how one or more database tables of the at least one database are related by particular attribute(s). The database schema may also indicate data table names, column names, column attribute datatypes, column descriptions, a combination thereof, and/or the like.

The computing device and/or the plurality of collector modules may loop through each of the one or more database tables of each of the plurality of databases in order to receive (e.g., retrieve) the database metadata for each of the plurality of databases. For example, a table may be selected from a list of database tables for at least one database of the plurality of databases by the computing device and/or at least one of the plurality of collector modules. The computing device and/or the at least one collector module may loop over each column in the selected table to determine column metadata. The column metadata may include a column name, a column attribute datatype(s), a column description(s), a combination thereof, and/or the like.

At step 804, the computing device or the plurality of collector modules may generate a database metadata table based on the database metadata for the at least one database. The database metadata table may include one or more of a plurality of column names, a plurality of column attribute datatypes, or a plurality of column descriptions associated with the at least one database. For example, the computing device and/or the at least one collector module may add the column metadata for the selected column to the database metadata table. The database metadata table may be stored in a central database of the computing device. The computing device and/or the at least one collector module may add the column metadata for the selected column to the database metadata table as part of an aggregation process. For example, the computing device and/or the at least one collector module may convert, or otherwise standardize, the column metadata into a common format. The converted/standardized column metadata may be stored as one or more rows of data in the database metadata table. The one or more rows of data may include one or more of the following: a data table name, a column name, a column attribute datatype, or a column description. Each row of the database metadata table may be further indicative of an identifier for the particular database associated with the database metadata stored in that row.

Each of the columns in the selected table may be looped over to determine column metadata for each. Once all of the columns in the selected table have been looped over, a next table of the of the one or more database tables of the at least one database may be selected, and the aforementioned procedure may be repeated until each of the tables have been processed. Once all of the tables of the one or more database tables of the at least one database have been processed, a next a database from the plurality of databases may be selected. The aforementioned procedure may therefore repeat until all of the plurality of databases have been processed. In this way, the database metadata table may be populated with database metadata (e.g., column metadata) for each column of each table of each of the plurality of databases.

At step 806, one or more character patterns may be used to determine at least one column name of the plurality of column names, at least one column attribute datatype of the plurality of column attribute datatypes, or at least one column description of the plurality of column descriptions associated with personal information (PI). The one or more character patterns may be associated with one or more database metadata rules. For example, an analyzer module of the computing device may apply the one or more database metadata rules to the database metadata table in order to determine at least one portion of the database metadata table that may be associated with PI. The database metadata rules may be configured to locate the one or more character patterns, which may be likely to be indicative of PI-associated data. The one or more character patterns to be located may be selected by the analyzer module.

For example, the one or more character patterns to be located may be selected by the analyzer module based on a request to locate PI-associated data for a particular individual, a group of individuals, or any and all individuals. The request may include one or more PI elements to be searched, and the one or more character patterns may be selected based on the one or more PI elements. The database metadata table may be retrieved by the analyzer module. The analyzer module may then perform an iterative procedure in order to determine the at least one column name of the plurality of column names, the at least one column attribute datatype of the plurality of column attribute datatypes, or the at least one column description of the plurality of column descriptions associated with PI. For example, the analyzer module may locate the one or more character patterns in one or more rows of the database metadata table in order to determine the at least one column name of the plurality of column names, the at least one column attribute datatype of the plurality of column attribute datatypes, or the at least one column description of the plurality of column descriptions associated with PI.

The analyzer module may determine whether there is a match in the one or more rows of the database metadata table. The patterns of characters that the one or more database metadata rules are configured to locate in the one or more rows of the database metadata table may be an exact match or a partial match (e.g., a fuzzy match). When a match is determined to exist in the one or more rows of the database metadata table, the data stored in the one or more rows of the database metadata table may be inserted into a result table. The data stored in the result table may be indicative of the at least one portion of the database metadata table associated with the one or more PI elements as well as a corresponding database identifier(s) for one or more of the plurality of databases at which the data associated with the one or more PI elements is/are stored.

For example, a row of the result table may include a database location, a database name, and/or a PI element(s) that is/are matched. As another example, the row of the result table may include a flag or other identifier to indicate what type of match was determined. The types of possible matches may include, for example, an exact match, a partial match, or a manual match. An exact match may be determined when the applied database metadata rule locates a pattern of characters in the selected row that corresponds one-to-one with the particular pattern of characters for which the applied database metadata rule is configured to locate. A partial match may be determined when the applied database metadata rule locates a pattern of characters in the selected row that partially corresponds with the particular pattern of characters for which the applied database metadata rule is configured to locate (e.g., 50% or more of the particular pattern is located). A manual match may be determined when the applied database metadata rule cannot locate a pattern of characters in the selected row that corresponds with the particular pattern of characters for which the applied database metadata rule is configured to locate (e.g., an administrator manually determines an exact or partial match is located).

The result table may be generated by the computing device and stored in a database separate from the plurality of databases. For example, the result table may be stored in a central database of the computing device. The result table may be provided by the analyzer module to another computing device (e.g., a computing device associated with an initiation of a request for PI-associated data).

Figure 9:
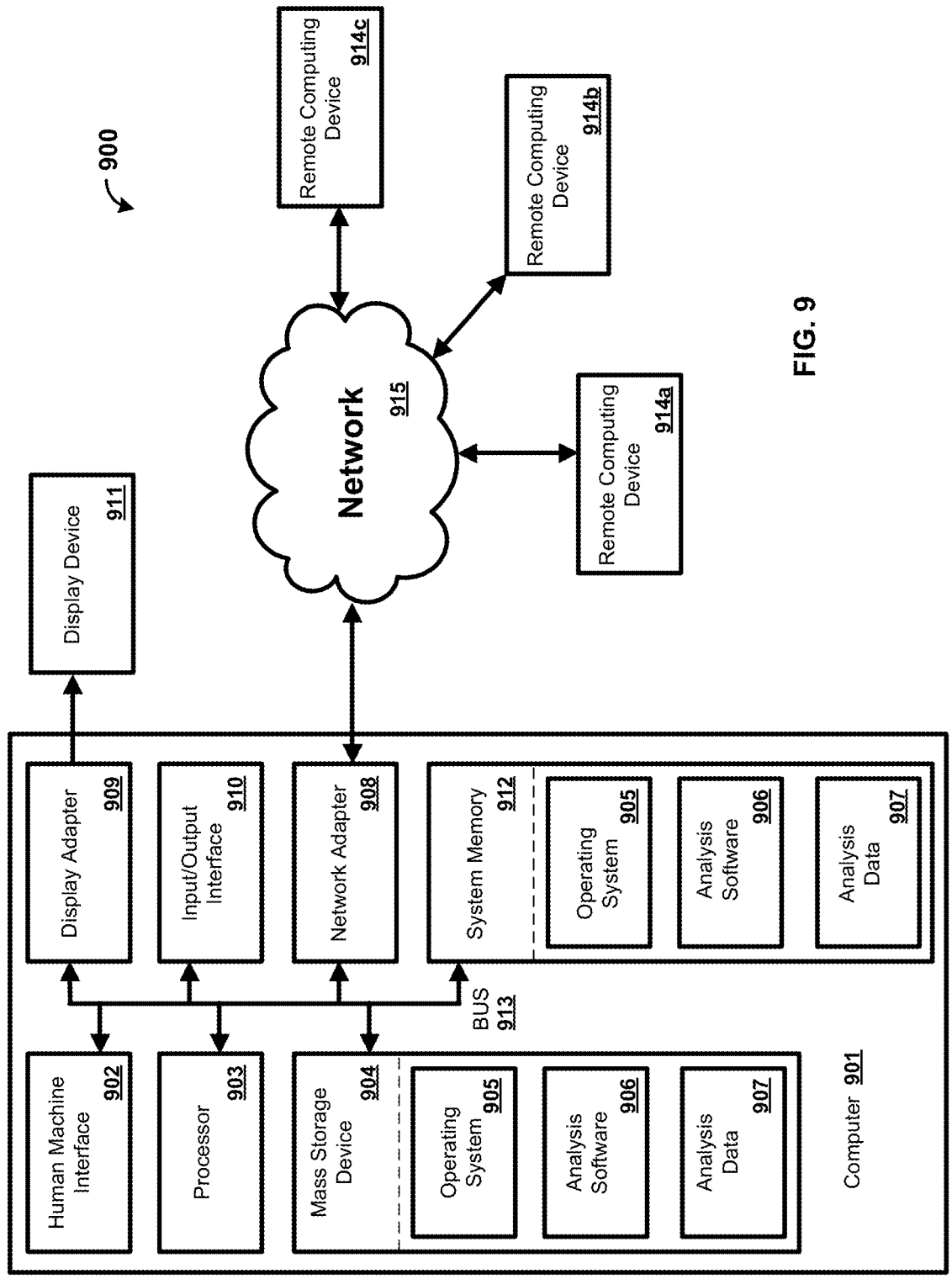
FIG. 9 shows a block diagram of an example computing device.

In an exemplary aspect, the methods and systems may be implemented on a computer 901 as illustrated in FIG. 9 and described below. Similarly, the methods and systems disclosed may utilize one or more computers to perform one or more functions in one or more locations. FIG. 9 shows a block diagram illustrating an exemplary operating environment 900 for performing the disclosed methods. This exemplary operating environment 900 is only an example of an operating environment and is not intended to suggest any limitation as to the scope of use or functionality of operating environment architecture. Neither should the operating environment 900 be interpreted as having any dependency or requirement relating to any one or combination of components illustrated in the exemplary operating environment 900.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods may also be practiced in grid-based and distributed computing environments where tasks are performed by remote processing devices that are linked through a communications network. In a distributed computing environment, program modules may be located in local and/or remote computer storage media including memory storage devices.

Further, one skilled in the art will appreciate that the systems and methods disclosed herein may be implemented via a general-purpose computing device in the form of a computer 901. The computer 901 may comprise one or more components, such as one or more processors 903, a system memory 912, and a bus 913 that couples various components of the computer 901 including the one or more processors 903 to the system memory 912. In the case of multiple processors 903, the system may utilize parallel computing.

The bus 913 may comprise one or more of several possible types of bus structures, such as a memory bus, memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description may also be implemented over a wired or wireless network connection and one or more of the components of the computer 901, such as the one or more processors 903, a mass storage device 904, an operating system 905, analysis software 906, analysis data 907, a network adapter 908, system memory 912, an Input/Output Interface 910, a display adapter 909, a display device 911, and a human machine interface 902, may be contained within one or more remote computing devices 914a,b,c at physically separate locations, connected through buses of this form, in effect implementing a fully distributed system. As an example, the analysis software 906 may store routines and subroutines for implementing the workflows 200, 300, and/or 500. As another example, the analysis data 907 may include the data that is processed according to the workflows 200, 300, and/or 500.

The computer 901 typically comprises a variety of computer readable media. Exemplary readable media may be any available media that is accessible by the computer 901 and comprises, for example and not meant to be limiting, both volatile and non-volatile media, removable and non-removable media. The system memory 912 may comprise computer readable media in the form of volatile memory, such as random access memory (RAM), and/or non-volatile memory, such as read only memory (ROM). The system memory 912 typically may comprise data such as content management data 907 and/or program modules such as operating system 905 and content management software 906 that are accessible to and/or are operated on by the one or more processors 903.

In another aspect, the computer 901 may also comprise other removable/non-removable, volatile/non-volatile computer storage media. The mass storage device 904 may provide non-volatile storage of computer code, computer readable instructions, data structures, program modules, and other data for the computer 901. For example, a mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 904, including by way of example, an operating system 905 and content management software 906. One or more of the operating system 905 and content management software 906 (or some combination thereof) may comprise elements of the programming and the content management software 906. Content management data 907 may also be stored on the mass storage device 904. Content management data 907 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple locations within the network 915.

In another aspect, a user may enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

In yet another aspect, a display device 911 may also be connected to the bus 913 via an interface, such as a display adapter 909. It is contemplated that the computer 901 may have more than one display adapter 909 and the computer 901 may have more than one display device 911. For example, a display device 911 may be a monitor, an LCD (Liquid Crystal Display), light emitting diode (LED) display, television, smart lens, smart glass, and/or a projector. In addition to the display device 911, other output peripheral devices may comprise components such as speakers (not shown) and a printer (not shown) which may be connected to the computer 901 via Input/Output Interface 910. Any step and/or result of the methods may be output in any form to an output device. Such output may be any form of visual representation, including, but not limited to, textual, graphical, animation, audio, tactile, and the like. The display 911 and computer 901 may be part of one device, or separate devices.

The computer 901 may operate in a networked environment using logical connections to one or more remote computing devices 914a,b,c. By way of example, a remote computing device 914a,b,c may be a personal computer, computing station (e.g., workstation), portable computer (e.g., laptop, mobile phone, tablet device), smart device (e.g., smartphone, smart watch, activity tracker, smart apparel, smart accessory), a server, a router, a network computer, a peer device, edge device or other common network node, and so on. Logical connections between the computer 901 and a remote computing device 914a,b,c may be made via a network 915, such as a local area network (LAN) and/or a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components may reside at various times in different storage components of the computing device 901, and are executed by the one or more processors 903 of the computer 901. An implementation of content management software 906 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
retrieving, by a computing device, first database metadata for a first plurality of data tables stored within a first database without collecting row data stored in the first plurality of data tables;
retrieving, by the computing device, second database metadata for a second plurality of data tables stored within a second database without collecting row data stored in the second plurality of data tables, wherein the first database is compatible with a first database type and the second database is compatible with a second database type that is different than the first database type, wherein the first database metadata and the second database metadata each comprise a plurality of column names from the first plurality of data tables and the second plurality of data tables, respectively;
converting, by the computing device, the first database metadata from the first database type to a common format and the second database metadata from the second database type to the common format;
based on the converting of the first database metadata from the first database type to the common format and the converting of the second database metadata to the common format, storing a database metadata table comprising both of the first database metadata and the second database metadata, wherein a first column of the database metadata table comprises the plurality of column names and a second column of the database metadata table comprises one of a plurality of column attribute datatypes or a plurality of column descriptions associated with the plurality of column names;
determining, based on a request for data associated with one or more personal information (PI) elements associated with a requesting party, one or more database metadata rules, wherein the one or more database metadata rules are configured to identify one or more column names, of the plurality of column names within the database metadata table, associated with one or more data tables that comprise the data associated with the one or more PI elements;
determining, based on the one or more database metadata rules and the one or more column names, a portion of the database metadata table indicative of one or more of the first database and/or the second database, of the first plurality of data tables stored within the first database or of the second plurality of data tables stored within the second database, comprising the one or more data tables that comprise the data associated with the one or more PI elements, wherein the data associated with the one or more PI elements is stored in the one or more data tables as row data; and
sending, based on the data associated with the one or more PI elements, a response to the request.

2. The method of claim 1, wherein the determining the one or more database metadata rules comprises:
determining, based on the request, a jurisdictional requirement for a jurisdiction associated with one or more of the requesting party or the request; and
determining, based on the jurisdictional requirement, the one or more database metadata rules, wherein the jurisdictional requirement defines PI for the jurisdiction.

3. The method of claim 1, wherein the portion of the database metadata table comprises one or more of a data table name of a plurality of data table names, a column name of the plurality of column names, a column attribute datatype of a plurality of column attribute datatypes, or a column description of a plurality of column descriptions.

4. The method of claim 1, wherein the data associated with the one or more PI elements comprises a full name associated with the requesting party, a partial name associated with the requesting party, a birth date associated with the requesting party, a birth year associated with the requesting party, a social security number associated with the requesting party, or a partial social security number associated with the requesting party.

5. The method of claim 1, wherein the determining the first database metadata for the first plurality of data tables stored within the first database comprises:
- establishing, by a collector, a communication session with the first database; and
- receiving, by the collector, the first database metadata for the first plurality of data tables stored within the first database.

6. The method of claim 1, wherein the one or more database metadata rules are configured to identify one or more character patterns within the database metadata table indicative of the one or more PI elements.

7. The method of claim 6, wherein the determining the portion of the database metadata table comprises:
- determining, based on the one or more database metadata rules, that the portion of the database metadata table comprises one or more of a column name, a column attribute datatype, or a column description that matches the one or more character patterns.

8. The method of claim 1, wherein the request for the data associated with the one or more PI elements associated with the requesting party comprises a request to determine whether PI associated with the requesting party is stored in the first database and/or the second database.

9. The method of claim 1, wherein the first plurality of data tables stored within the first database or the second plurality of data tables stored within the second database comprises the one or more data tables that store the data associated with the one or more PI elements as row data, and wherein the plurality of column names are stored in the first plurality of data tables and/or the second plurality of data tables as column data.

10. A method comprising:
- retrieving, by a first collector of a computing device, first database metadata associated with for a first plurality of data tables stored within a first database without collecting row data stored in the first plurality of data tables;
- retrieving, by the computing device, second database metadata associated with a second plurality of data tables stored within a second database without collecting row data stored in the second plurality of data tables, wherein the first database is compatible with a first database type and the second database is compatible with a second database type that is different than the first database type, wherein the first database metadata and the second database metadata each comprise a plurality of column names from the first plurality of data tables and the second plurality of data tables, respectively;
- converting, by the computing device, the first database metadata from the first database type to a common format and the second database metadata from the second database type to the common format;
- based on the converting of the first database metadata from the first database type to the common format and the converting of the second database metadata to the common format, storing a database metadata table comprising both of the first database metadata and the second database metadata, wherein a first column of the database metadata table comprises the plurality of column names and a second column of the database metadata table comprises one one of a plurality of column attribute datatypes or a plurality of column descriptions associated with the plurality of column names;
- determining, based on a request for data associated with one or more personal information (PI) elements associated with a requesting party, one or more database metadata rules, wherein the one or more database metadata rules are configured to identify one or more column names, of the plurality of column names within the database metadata table, associated with one or more data tables that comprise the data associated with the one or more PI elements;
- determining, based on the one or more database metadata rules and the one or more column names of the first plurality of data tables and/or of the second plurality of data tables, a portion of the database metadata table indicative of one or more of the first database and the second database, comprising the one or more data tables that comprise the data associated with the one or more PI elements, wherein the data associated with the one or more PI elements is stored in the one or more data tables as row data; and
- sending, based on the data associated with the one or more PI elements, a response to the request.

11. The method of claim 10, wherein the determining the one or more database metadata rules comprises:
- determining, based on the request, a jurisdictional requirement for a jurisdiction associated with one or more of the requesting party or the request; and
- determining, based on the jurisdictional requirement, the one or more database metadata rules, wherein the jurisdictional requirement defines PI for the jurisdiction.

12. The method of claim 10, wherein the portion of the database metadata table comprises one or more of a column name of the plurality of column names, a column attribute datatype of a plurality of column attribute datatypes, or a column description of a plurality of column descriptions.

13. The method of claim 10, further comprising storing, at the database metadata table, a first identifier associated with the first database and a second identifier associated with the second database.

14. The method of claim 10, wherein the data associated with the one or more PI elements comprises a full name associated with the requesting party, a partial name associated with the requesting party, a birth date associated with the requesting party, a birth year associated with the requesting party, a social security number associated with the requesting party, or a partial social security number associated with the requesting party.

15. The method of claim 10, wherein the determining the one or more database metadata rules comprises:
- determining, based on a residence associated with the requesting party, a jurisdictional requirement; and
- determining, based on the jurisdictional requirement, the one or more database metadata rules.

16. The method of claim 10, wherein the determining the portion of the database metadata table comprises:
- determining, based on the one or more database metadata rules, that the portion of the database metadata table comprises one or more of a column name, a column attribute datatype, or a column description that matches one or more character patterns indicative of the one or more PI elements.

17. The method of claim 10, wherein the request for the data associated with the one or more PI elements associated with the requesting party comprises a request to determine whether PI associated with the requesting party is stored in the first database and/or the second database.

18. The method of claim 10, wherein the first plurality of data tables stored within the first database or the second plurality of data tables stored within the second database comprises the one or more data tables that store the data associated with the one or more PI elements as row data, and wherein the plurality of column names are stored in the first plurality of data tables and/or the second plurality of data tables as column data.

19. A method comprising:
retrieving, by a computing device in communication with a first database, first database metadata for a first plurality of data tables stored within the first database without collecting row data stored in the first plurality of data tables; and
retrieving, by the computing device in communication with a second database, second database metadata for a second plurality of data tables stored within the second database without collecting row data stored in the second plurality of data tables, wherein the first database is compatible with a first database type and the second database is compatible with a second database type that is different than the first database type, wherein the first database metadata and the second database metadata each comprise a plurality of column names from the first plurality of data tables and the second plurality of data tables, respectively;
converting, by the computing device, the first database metadata from the first database type to a common format and the second database metadata from the second database type to the common format;
based on the converting of the first database metadata from the first database type to the common format and the converting of the second database metadata to the common format, storing, based on each of the first database metadata and the second database metadata, a database metadata table comprising the plurality of column names in a first column, and one or more of: a plurality of column attribute datatypes or a plurality of column descriptions associated with both of the first database and the second database, respectively, in one or more additional columns;
determining, based on a request for data associated with one or more personal information (PI) elements associated with a requesting party, one or more database metadata rules, wherein the one or more database metadata rules are configured to identify one or more character patterns within the database metadata table indicative of the one or more PI elements;
determining, based on the one or more character patterns, at least one column name of the plurality of column names and one or more of: at least one column attribute datatype of the plurality of column attribute datatypes or at least one column description of the plurality of column descriptions indicative of one or more data tables of the first database and/or the second database that comprise the data associated with the one or more PI elements wherein the data associated with the one or more PI elements is stored in the one or more data tables as row data; and
sending, based on the data associated with the one or more PI elements, a response to the request.

20. The method of claim 19, wherein the one or more PI elements comprise a full name associated with the requesting party, a partial name associated with the requesting party, a birth date associated with the requesting party, a birth year associated with the requesting party, a social security number associated with the requesting party, or a partial social security number associated with the requesting party.

21. The method of claim 19, wherein the at least one column name, the at least one column attribute datatype, or the at least one column description matches the one or more character patterns.

22. The method of claim 19, wherein the determining the one or more database metadata rules comprises:
determining, based on a residence associated with the requesting party, a jurisdictional requirement for a jurisdiction associated with one or more of the requesting party or the request; and
determining, based on the jurisdictional requirement, the one or more database metadata rules, wherein the jurisdictional requirement defines PI for the jurisdiction.

23. The method of claim 19, wherein the retrieving the first database metadata for the first plurality of data tables stored within the first database comprises:
establishing, by at least one collector associated with the computing device, a communication session with the first database, wherein the at least one collector is configured to communicate with databases associated with the first database type.

24. The method of claim 23, further comprising:
receiving, by the at least one collector, the first database metadata for the first database.

25. The method of claim 19, wherein the request for the data associated with the one or more PI elements associated with the requesting party comprises a request to determine whether PI associated with the requesting party is stored in the first database and/or the second database.

26. The method of claim 19, wherein the first plurality of data tables stored within the first database or the second plurality of data tables stored within the second database comprises the one or more data tables that store the data associated with the one or more PI elements as row data, and wherein the plurality of column names are stored in the first plurality of data tables and/or the second plurality of data tables as column data.

* * * * *